United States Patent [19]
Smith

[11] Patent Number: 5,455,300
[45] Date of Patent: Oct. 3, 1995

[54] GRAFT COPOLYMER OF PROPYLENE POLYMER MATERIAL IMPACT MODIFIED WITH A HETEROPHASIC OLEFIN POLYMER MATERIAL

[75] Inventor: Jeanine A. Smith, West Chester, Pa.

[73] Assignee: Montell North America Inc., Wilmington, Del.

[21] Appl. No.: 283,234

[22] Filed: Jul. 29, 1994

[51] Int. Cl.$^6$ .................................................. C08L 51/06
[52] U.S. Cl. .................... 525/74; 525/78; 525/80
[58] Field of Search .................. 525/80, 78, 74, 525/73, 71; 524/504

[56] References Cited

U.S. PATENT DOCUMENTS

| | | |
|---|---|---|
| 3,314,904 | 4/1967 | Burkus ............................ 525/71 |
| 4,419,491 | 12/1983 | Sakano et al. ..................... 525/67 |
| 4,537,933 | 8/1985 | Walker et al. ..................... 525/71 |
| 4,560,725 | 12/1985 | Van Bokhoven et al. .......... 525/67 |
| 4,990,558 | 2/1991 | DeNicola, Jr. et al. ............ 524/504 |
| 5,212,246 | 5/1993 | Ogale ............................... 525/240 |
| 5,286,564 | 2/1994 | Cecchin et al. ................... 428/402 |
| 5,286,791 | 2/1994 | DeNicola, Jr. et al. ............ 525/71 |
| 5,310,794 | 5/1994 | DeNicola, Jr. et al. ............ 525/71 |
| 5,331,047 | 7/1994 | Giacobbe .......................... 525/88 |
| 5,397,836 | 3/1995 | DeNicola, Jr. et al. ............ 525/71 |

*Primary Examiner*—Paul R. Michl
*Assistant Examiner*—Mark L. Warzel

[57] ABSTRACT

Disclosed are polyolefin compositions comprising (A) a graft copolymer of a propylene polymer material, (B) a heterophasic olefin polymer material and, optionally, (C) an ungrafted propylene polymer material.

19 Claims, No Drawings

GRAFT COPOLYMER OF PROPYLENE POLYMER MATERIAL IMPACT MODIFIED WITH A HETEROPHASIC OLEFIN POLYMER MATERIAL

FIELD OF THE INVENTION

This invention relates to a composition comprising a grafted copolymer of propylene polymer material, a heterophasic olefin polymer material and, optionally, an ungrafted propylene polymer material.

BACKGROUND OF THE INVENTION

Typically, graft copolymers of olefin polymer materials have been impact modified with ethylene/propylene copolymer rubber, ethylene/propylene/diene monomer rubber, and ASA polymers. For example, U.S. Pat. No. 3,314,904 describes forming a "gum plastic" by making a graft copolymer of styrene on polyethylene or polypropylene, and, in particular, a graft interpolymer of styrene, acrylonitrile, and polyethylene or polypropylene, and blending the graft copolymer with certain selected compatible rubbery materials. The grafted styrene or styrene/acrylonitrile content of the graft copolymer is 75–95%, preferably 85–95%, and more preferably 90–95%. Hence the graft copolymer is predominantly bound styrene or bound styrene/acrylonitrile, and in the graft copolymers made from polypropylene, the polypropylene is only a minor component and present as a dispersed phase. Thus the properties of the bound styrene or styrene/acrylonitrile predominate. The graft copolymer is made by subjecting the polyolefin to high-energy ionizing radiation, and then contacting the irradiated polyolefin with styrene or with styrene and acrylonitrile.

U.S. Pat. No. 4,537,933 discloses a blend of a polyolefin graft polymer, preferably a polyvinyl halide polyolefin graft polymer, and an ASA polymer. The ASA polymer is a copolymer of styrene and acrylonitrile (SAN) that is modified with an acrylate polymer, a chlorinated polyethylene or an olefin-diolefin modified polymer, such as an ethylene/propylene polyene modified polymer. The ASA polymer modified with the olefin-diolefin modified polymer has a styrene/acrylonitrile content of 60–95%. The properties of the SAN predominate since the rubber is only a minor component and present as a dispersed phase. Also, the matrix phase of the polymeric components must be miscible.

The advantages of graft copolymers of a polymerizable monomer(s) on a propylene polymer backbone over physical blends of the polymers as stand-alone structural plastics could be better utilized if a means were found for imparting a better balance of properties to the graft copolymers.

Various compositions have been obtained in an attempt to achieve a better balance of properties. For example, U.S. Pat. No. 4,990,558 discloses a graft copolymer based rigid thermoplastic composition of (a) from 60 to 95%, by weight, of a graft copolymer of a styrenic polymer grafted onto a propylene polymer material backbone and (b) from 5 to 40%, by weight, of a rubber component comprising (1) from 20 to 100%, by weight, of (i) at least one monoalkenyl aromatic hydrocarbon-conjugated diene block copolymer, (ii) at least one block copolymer which is a hydrogenated copolymer of (i), or (iii) a mixture of at least one (i) with at least one (ii); and (2) 0 to 80%, by weight, of an olefin copolymer rubber, i.e. EPM or EPDM.

U.S. Pat. No. 5,286,791 discloses impact modified graft copolymer compositions comprising (A) from 10 to 90% of a graft copolymer of propylene polymer material having graft polymerized thereto one or more vinyl monomer(s); (B) from 90 to 10% of at least one broad molecular weight distribution propylene polymer material having a $M_w/M_n$ of 8 to 60, a melt flow rate of 0.5 to 50 and a xylene insolubles at 25° C. of greater than or equal to 94%; and (C) from 2 to 25% of at least one rubber component selected from (i) an olefin rubber containing two or more monomers selected from ethylene, propylene or butene, and optionally a non-conjugated diene, (ii) one or more monoalkenyl aromatic hydrocarbon-conjugated diene block copolymer or hydrogenated products thereof, (iii) a graft copolymer of propylene polymer material grafted with polymerizable monomer(s) which when polymerize form a rubbery polymer(s) having a Tg less than 20° C., and (iv) mixtures thereof.

In U.S. Pat. No. 5,397,836, there is disclosed thermoplastic blends comprising (A) 40 to 90% of a graft copolymer of a propylene polymer material having a polymerized monomer content of 5 to 70% and (B) 5 to 40% of a graft copolymer of an olefin rubber material having a polymerized monomer content of 5 to 50%, wherein the grafting monomer(s) are selected from the group consisting of (i) an aromatic vinyl compound, (ii) an acrylic compound, (iii) mixtures of (i) and (ii), and (iv) other copolymerizable monomers selected from the group consisting of $C_{1-10}$ linear or branched alkyl acrylates, acrylic acid, methacrylic acid, glycidyl methacrylate, glycidyl acrylate, acrylonitrile and methacrylonitrile with at least one (i) or at least one (ii) or mixtures of at least one (i) and at least one (ii) wherein said other copolymerizable monomer being present in an amount of up to 50% and (C) 5 to 20% of an ungrafted olefin rubber selected from (i) an olefin rubber containing two or more monomers selected from ethylene, propylene or butene, and optionally a non-conjugated diene, (ii) a propylene homopolymer or random copolymer of propylene and an olefin selected from ethylene and $C_4$–$C_{10}$ alpha-olefin impact modified with (1) defined above.

However, while a better balance of properties is obtained there is still some loss in weldline strength and retention thereof.

Thus, an impact modified graft copolymer composition having an overall balance of properties without a substantial loss in weldline strength and weldline strength retention is desired.

SUMMARY OF THE INVENTION

It has now been found that a significant improvement in weldline strength and retention thereof in graft copolymers of propylene polymer material can be achieved by impact modifying graft copolymers of propylene polymer material with heterophasic olefin polymer materials instead of with olefin rubbers, such as ethylene-propylene copolymer rubber, typically used for impact modification of graft copolymers. The polyolefin compositions of the present invention containing a graft copolymer of propylene polymer material and a heterophasic olefin polymer material demonstrate improved weldline strength and retention thereof, while retaining a balance of other properties.

The compositions are useful as stand-alone structural plastics for injection molding articles and extruded profiles.

According to the present invention, there is provided a polyolefin composition which comprises:

(A) from 95 to 35%, preferably 55 to 85%, of a graft copolymer of propylene polymer material having grafted thereon monomer(s) selected from the group consisting of (i) aromatic vinyl compounds, (ii) acrylic compounds, (iii) mixtures of (i) and (ii), and (iv) other copolymerizable monomers with at least one (i) or at least one (ii) or mixtures of at least one (i) and at least one (ii), wherein the grafted monomer content is from 5 to 70%;

(B) from 5 to 65%, preferably 15 to 45%, of a heterophasic olefin polymer material consisting essentially of:
  (a) from about 10 to 50% of a propylene homopolymer having an isotactic index greater than 80, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin as defined in (a) (ii), said copolymer containing over 80% propylene and having an isotactic index greater than 80;
  (b) from about 5 to 20% of a semi-crystalline, essentially linear copolymer fraction having a crystallinity of about 20 to 60% wherein the copolymer is selected from the group consisting of (i) ethylene and propylene containing over 55% ethylene, (ii) ethylene, propylene, and an alpha-olefin as defined in (a) (ii) containing from 1 to 10% of the alpha-olefin and over 55% of both ethylene and alpha-olefin, and (iii) ethylene and an alpha-olefin as defined in (a) (ii) containing over 55% of said alpha-olefin, which copolymer is insoluble in xylene at room or ambient temperature; and
  (c) from about 40 to 80% of a copolymer fraction is selected from the group consisting of a copolymer of (i) ethylene and propylene wherein the copolymer contains from 20% to less than 40% ethylene and, (ii) ethylene, propylene, and an alpha-olefin as defined in (a) (ii) wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of the alpha-olefin, and optionally with 0.5 to 10 % of a diene, said copolymer fraction being soluble in xylene at ambient temperature, and having an intrinsic viscosity of from 1.5 to 4.0 dl/g; with the total of the (b) and (c) fractions, based on the total olefin polymer composition, being from about 50% to 90%, and the weight ratio of (b)/(c) being less than 0.4; and (C) from 0 to 55%, preferably 0 to 20%, of an ungrafted propylene polymer material selected from the group consisting of (i) a propylene homopolymer and (ii) a random copolymer of propylene with an olefin selected from the group consisting of ethylene and $C_4$–$C_8$ alpha-olefins.

DETAILED DESCRIPTION OF THE INVENTION

Unless otherwise specified all percentages and parts are by weight in this specification.

The propylene polymer material backbone of component (A) can be (i) a homopolymer of propylene having an isotactic index of greater than 90, preferably from 90 to 98, (ii) a random copolymer of propylene and an olefin selected from ethylene and $C_4$–$C_8$ alpha-olefins, provided that, when the olefin is ethylene, the maximum polymerized ethylene content is about 10%, preferably about 4%, and when the olefin is a $C_4$–$C_8$ alpha-olefin, the maximum polymerized content thereof is about 20%, preferably about 16% or (iii) a random terpolymer of propylene with two alpha-olefins selected from the group consisting of ethylene and $C_4$–$C_8$ alpha-olefin, provided that the maximum polymerized $C_4$–$C_8$ alpha-olefin content is about 20%, preferably about 16%, and when ethylene is one of said alpha-olefins, the maximum polymerized ethylene content is about 5%, preferably about 4%.

The $C_4$–$C_8$ alpha-olefins include linear or branched $C_4$–$C_8$ alpha-olefins such as 1-butene, 1-pentene, 4-methyl-1-pentene, 3-methyl-1-butene, 1-hexene, 3,4-dimethyl-1-butene, 1-heptene, 3-methyl-1-hexene and the like.

Preferred propylene polymer material backbones are polypropylene and ethylene/propylene random Copolymer.

The monomer(s) to be grafted onto the propylene polymer material backbone of component (a) can be (i) aromatic vinyl compounds selected from styrene, an alkyl or alkoxy ring-substituted styrene where the alkyl or alkoxy is a $C_{1-4}$ linear or branched alkyl or alkoxy, mixtures thereof wherein the alkyl or alkoxy ring-substituted styrene is present in an amount of from 5 to 95%, or mixtures of styrene or an alkyl or alkoxy ring-substituted styrene with 5 to 40% of alpha-methyl-styrene or alpha-methyl-styrene derivatives; (ii) acrylic compounds selected from methyl methacrylate, ethyl methacrylate, benzyl methacrylate, phenyl methacrylate or $C_{1-4}$ alkoxy substituted phenyl methacrylate; (iii) mixtures of (i) and (ii); or (iv) other copolymerizable monomers selected from linear or branched alkyl acrylates having from 1 to 10 carbon atoms, acrylic acid, methacrylic acid, glycidyl methacrylate, glycidyl acrylate, maleic anhydride, acrylonitrile or meth-acrylonitrile with at least one (i) or at least one (ii) or mixtures of at least one (i) and at least one (ii) wherein said other copolymerizable monomer is present in an amount of up to 50%, preferably 1 to 40%.

Preferred grafting monomers are styrene, methyl methacrylate, styrene/acrylonitrile, styrene/methyl methacrylate, styrene/maleic anhydride, styrene/alpha-methyl styrene/maleic anhydride, methyl methacrylate/maleic anhydride, methyl methacrylate/methylacrylate, methyl methacrylate/acrylonitrile, methyl methacrylate/methacrylonitrile, styrene/methyl methacrylate/methacrylonitrile and styrene/methyl methacrylate/acrylonitrile.

Suitable particulate forms of the grafted propylene polymer material include powder, flake, granulate, spherical, cubic and the like. Spherical particulate forms which are prepared from a propylene polymer material having a pore volume fraction of at least about 0.07 are preferred.

Most preferred for preparing the grafted propylene polymer material is a propylene polymer material having (1) a weight average diameter of about 0.4 to 7 mm, (2) a surface area of at least 0.1 $m^2/g$, and (3) a pore volume fraction of at least about 0.07 wherein more than 40% of the pores in the particle have a diameter larger than 1 micron. Such propylene polymer materials are commercially available from HIMONT Italia S.r.l. and HIMONT U.S.A.

In the heterophasic olefin polymer material of component (B), preferably (a) is present in the amount of from 20 to 50%, most preferably from 20 to 35%. When (a) is a propylene homopolymer the isotactic index is preferably from 85 to 98%. When (a) is a copolymer, the amount of propylene present in the copolymer is preferably from 90 to 99%.

The (b) component in the heterophasic olefin polymer material is preferably present in an amount of from 5 to 12%. Typically the crystallinity is about 20 to 60%, by differential scanning calorimetry (DSC). Generally, the ethylene or said alpha-olefin content or the combination of ethylene and said alpha-olefin when both are present is over 50% up to 98%, preferably 80 to 95%.

Component (c) of the heterophasic olefin polymer material is preferably present in an amount of 40 to 70%. The ethylene or said alpha-olefin content or the ethylene and said alpha-olefin content of component (c) is preferably from 20 to 38%. When component (c) is a terpolymer, the said alpha-olefin is typically present in an amount from 1 to 10%, preferably 1 to 5%. The preferred intrinsic viscosity is form 1.7 to 3 dl/g.

The total amount of (b) and (c), based on the total olefin polymer composition is preferably from 65 to 80% and the weight ratio of (b)/(c) is preferably from 0.1 to about 0.3.

The total amount of ethylene units or said alpha-olefin units, or of ethylene and said alpha-olefin units when both are present, in the olefin polymer composition is from about 15% to about 35%.

Suitable alpha-olefins of the formula $CH_2=CHR$ include butene-1, pentene-1, 4-methylpentene-1, hexene-1, and octene-1. When used to prepare component (a) they are present in such quantities that the isotactic index of the resulting polymer is not less than 80%.

When a diene is present during the preparation of components (b) and (c), it is typically a butadiene, 1,4-hexadiene, 1,5-hexadiene, ethylidene norbornene diene monomer and is typically present in amount from 0.5 to 10%, preferably 1 to 5%.

The heterophasic olefin polymer materials have at least one melt peak, determined by DSC, present at temperatures higher than 120° C., and at least one peak, relative to the vitreous transition, present at temperatures from −10° C. and −35° C.

In addition, these compositions have a flexural modulus of less than 150 MPa, generally from 20 and 100 MPa; a tensile strength at yield of from 10 to 20 MPa, elongation at break over 400%; a tension set, at 75% strain, from 20% to 50%; a Shore D hardness from 20 and 35; and do not break (no brittle impact failure) when an IZOD impact test is conducted at −50° C.

Preferably the haze values are less than 40%, most preferably less than 35%.

Copolymer and terpolymers of propylene and ethylene or an alpha-olefin or of propylene, ethylene and an alpha-olefin are preferred as component (a), and copolymers of propylene with ethylene or an alpha-olefin are most preferred as component (a) of the heterophasic olefin polymer composition.

The grafted propylene polymer material of the present invention is prepared by the free radical-initiated graft polymerization of at least one monomer as set forth above, at free radical sites on propylene polymer material and olefin rubber material. The free radical sites may be produced by irradiation or by a free radical generating chemical material, e.g., by reaction with a suitable organic peroxide.

According to the method where the free radical sites are produced by irradiation, the propylene polymer material, preferably in particulate form, is irradiated at a temperature in the range of about 10° to 85° C. with high-energy ionizing radiation to produce free radical sites in the propylene polymer material. The irradiated propylene polymer material, while being maintained in a substantially non-oxidizing atmosphere, e.g., under inert gas, is then treated at a temperature up to about 100° C. for a period of at least about 3 minutes, with about from 5 to 80% of the particular grafting monomer or monomers used, based on the total weight of propylene polymer material and grafting monomer(s). After the propylene polymer material has been exposed to the monomer for the selected period of time, simultaneously or successively in optional order, the resultant grafted propylene polymer material, while still maintained in a substantially non-oxidizing environment, is treated to deactivate substantially all of the residual free radicals therein, and any unreacted grafting monomer is removed from said material.

The free radical deactivation of the resulting graft copolymer is conducted preferably by heating, although it can be accomplished by the use of an additive, e.g., methyl-mercaptan, that functions as a free radical trap. Typically the deactivation temperature will be at least 110° C., preferably at least 120° C. Heating at the deactivation temperature for at least 20 minutes is generally sufficient.

Any unreacted grafting monomer is removed from the graft copolymer, either before or after the radical deactivation, or at the same time as deactivation. If the removal is effected before or during deactivation, a substantially non-oxidizing environment is maintained.

In the method where the free radical sites are produced by an organic chemical compound, the organic chemical compound, preferably an organic peroxide, is a free radical polymerization initiator which has a decomposition half-life of about 1 to 240 minutes at the temperature employed during the treatment. Suitable organic peroxides include acyl peroxides, such as benzoyl and dibenzoyl peroxides; dialkyl and aralkyl peroxides, such as di-tert-butyl peroxide, dicumyl peroxide, cumyl butyl peroxide, 1,1-di-tert-butyl-peroxy-3,5,5-trimethylcyclohexane, 2,5-dimethyl-2,5-di-tert-butylperoxyhexane, and bis(alpha-tert-butylperoxyisopropylbenzene); peroxy esters, such as tert-butylperoxy pivalate, tert-butylperbenzoate, 2,5-dimethylhexyl-2,5-di(perbenzoate), tert-butyl-di-(perphthalate), tert-butyl-peroxy-2-ethyl hexanoate; and 1,1-dimethyl-3-hydroxybutyl-peroxy-2-ethyl hexanoate; and peroxy carbonates, such as di(2-ethylhexyl)peroxy dicarbonate, di(n-propyl)peroxy dicarbonate, and di(4-tert-butylcyclohexyl)peroxy dicarbonate. The peroxides can be used neat or in a diluent medium, having an active concentration of from 0.1 to 6.0 pph, preferably from 0.2 to 3.0 pph, where pph is based on 100 parts by weight of propylene polymer material.

According to this method, the propylene polymer material, preferably in particulate form, at a temperature of from about 60° C. to 125° C. is treated with from 0.1 to 6.0 pph of a free radical polymerization initiator described above. The polymer material is treated with about 5 to 240 pph of a grafting monomer at a rate of addition that does not exceed 4.5 pph per minute at all addition levels of 5 to 240 pph of the monomer, over a period of time which coincides with, or follows, the period of treatment with the initiator. In other words, the monomer and initiator may be added to the heated propylene polymer material at the same time or the monomer may be added 1) after the addition of the initiator has been completed, 2) after addition of the initiator has started but has not yet been completed, or 3) after a delay time or hold time subsequent to the completion of the initiator addition.

After the propylene polymer material has been grafted, the resultant grafted propylene polymer material, while still maintained in a substantially non-oxidizing environment, is treated, preferably by heating at a temperature of at least 120° C. for at least 20 minutes, to decompose any unreacted initiator and deactivate residual free radicals therein. Any unreacted grafting monomer is removed from said material, either before or after the radical deactivation, or at the same time as deactivation.

The heterophasic olefin polymer materials used in the present invention as component (B) are prepared by sequential polymerization in two or more stages, using highly stereospecific Zielger-Natta catalyst, wherein the first stage the propylene or propylene and ethylene or said alpha-olefin or propylene, ethylene or said alpha-olefin are polymerized to form component (a), and in the following stages the mixtures ethylene and propylene or said alpha-olefin or ethylene, propylene and said alpha-olefin, and optionally a diene, are polymerized to form components (b) and (c).

The polymerization can be conducted in liquid phase, gas phase, or liquid-gas phase using separate reactors, all of which can be done either by batch or continuously. For example, it is possible to carry out the polymerization of component (a) using liquid propylene as diluent, and the polymerization of components (b) and (c) in gas phase, without intermediate stages except for the partial degassing of the propylene. This is the preferred method.

The polymerization reactions are carried out in an inert atmosphere in the presence of an inert hydrocarbon solvent or of a liquid or gaseous monomer.

Suitable inert hydrocarbon solvents include saturated hydrocarbons, such as propane, butane, hexane and heptane.

Hydrogen can be added as needed as a chain transfer agent for control of the molecular weight.

The reaction temperature in the polymerization of component (a) and for the polymerization of components (b) and (c), can be the same or different, and is generally from 40° C. to 90° C., preferably 50° to 80° C. for the polymerization of component (a), and 40° to 65° C. for the polymerization of components (b) and (c).

The pressure of the polymerization of component (a), if carried out in liquid monomer, is the one which competes with the vapor pressure of the liquid propylene at the operating temperature used, eventually modified by the vapor pressure of the small quantity of inert diluent used to feed the catalyst mixture, and the overpressure of optional monomers and the hydrogen used as molecular weight regulator.

The pressure of the polymerization of components (b) and (c), if done in gas phase, can be from 5 to 30 atm. The residence times relative to the two stages depend on the desired ratio between fraction (a) and (b)+(c), and are usually from 15 min. to 8 hours.

The catalyst used in the polymerization comprises the reaction product of 1) a solid component containing a halogen-containing titanium compound and an electron-donor compound (internal donor) supported on an activated magnesium chloride, 2) a non-halogen containing Al-trialkyl compound and 3) an electron-donor compound (external donor).

Suitable titanium compounds include those with at least one Ti-halogen bond, such as halides and alkoxy halides of titanium.

In order to obtain these olefin polymer compositions in the form of flowable spherical particles having a high bulk density, the solid catalyst component must have a) a surface area smaller than 100 m$^2$/g, preferably between 50 and 80 m$^2$/g, b) a porosity from 0.25 to 0.4 cc/g. and c) an X-ray spectrum, where the magnesium chloride reflections appear, showing the presence of a halo between the angles 2θ of 33.5° and 35° and by the absence of the reflection at 2θ of 14.95°. The symbol θ=Bragg angle.

The solid catalyst component is prepared by forming an adduct of magnesium dichloride and an alcohol, such as ethanol, propanol, butanol and 2-ethylhexanol, containing generally 3 moles of alcohol per mole of MgCl$_2$, emulsifying the adduct, cooling the emulsion quickly to cause the adduct to solidify into spherical particles, and partially dealcoholating the particulate adduct by gradually increasing the temperature from 50° C. to 130° C. for a period of time sufficient to reduce the alcohol content from 3 moles to 1–1.5 moles per mole of MgCl$_2$. The partially dealcoholated adduct is then suspended in TiCl$_4$ at 0° C., such that the concentration of adduct to TiCl$_4$ is 40–50 g/l TiCl$_4$. The mixture is then heated to a temperature of 80° C. to 135° C. for a period of about 1–2 hr. When the temperature reaches 40° C., sufficient electron donor is added so that the desired molar ratio of Mg to electron donor is obtained.

An electron-donor compound selected preferably among the alkyl, cycloalkyl, and aryl phthalates, such as for example diisobutyl, di-n-butyl, and di-n-octyl phthalate, is added to the TiCl$_4$.

When the heat treatment period has ended, the excess hot TiCl$_4$ is separated by filtration or sedimentation, and the treatment with TiCl$_4$ is repeated one or more times. The solid is then washed with a suitable inert hydrocarbon compound, such as hexane or heptane, and dried.

The solid catalyst component typically has the following characteristics:

| | |
|---|---|
| Surface area: | less than 100 m$^2$/g, preferably between 50 and 80 m$^2$/g |
| Porosity: | 0.25–0.4 cc/g |
| Pore volume distribution: | 50% of the pores have a radius greater than 100 angströms. |
| X-ray spectrum: | where the Mg chloride reflections appear, showing a halo with maximum intensity between angles of 2θ of 33.5° and 35°+0and where the reflection at 2θ of 14.95° is absent. |

The catalyst is obtained by mixing the solid catalyst component with a trialkyl aluminum compound, preferably triethyl aluminum and triisobutyl aluminum, and an electron-donor compound.

Various electron donor compounds are known in the art. The preferred electron donor compounds are those silane compounds having the formula R'R"Si(OR)$_2$ where R' and R" may be the same or different and are C$_{1-18}$ normal or branched alkyl, C$_{5-18}$ cycloalkyl, or C$_{6-8}$ aryl radicals, and R is a C$_{1-4}$ alkyl radical.

Typical silane compounds which may be used include diphenyldimethoxysilane, dicyclohexyldimethoxysilane, methyl-t-butyldimethoxysilane, diisopropyldimethoxysilane, dicyclopentyldimethoxysilane, cyclohexylmethyldimethoxysilane and phenyltrimethoxysilane.

The Al/Ti ratio is typically between 10 and 200 and the Al/silane molar ratio between 1/1 and 1/100.

The catalysts may be precontacted with small quantities of olefin monomer (prepolymerization), maintaining the catalyst in suspension in a hydrocarbon solvent and polymerizing at a temperature from room temperature to 60° C. for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

The content and amount of catalyst residue in the thermoplastic olefin polymers of this invention is sufficiently small so as to make the removal of catalyst residue, typically referred to as deashing, unnecessary.

The thermoplastic olefin polymers prepared with the aforementioned catalyst are in spheroidal particle form, and the particles have a diameter from 0.5 to 7 mm.

The ungrafted propylene polymer material of Component (C) can be (i) a homopolymer of propylene having an isotactic index of greater than 90, preferably from 90 to 98, (ii) a random copolymer of propylene and an olefin selected from ethylene and $C_4$–$C_8$ alpha-olefins, provided that, when the olefin is ethylene, the maximum polymerized ethylene content is about 10%, preferably about 4%, and when the olefin is a $C_4$–$C_8$ alpha-olefin, the maximum polymerized content thereof is about 20%, preferably about 16% as set forth herein for the propylene polymer material useful in preparing the backbone of the graft copolymer of component (A). Preferably, the ungrafted propylene polymer material is a propylene homopolymer.

Up to about 80 parts (total) of additives such as fillers, reinforcing agents, etc., per 100 parts of the graft copolymer and the rubber component can be included in the composition.

The compositions of the present invention are prepared by mechanically blending the components in conventional mixing equipment, i.e., a single or twin screw extruder, Banbury mixer or any other conventional melt compounding equipment. The order in which the components of the composition are mixed is not critical.

The present invention will be illustrated in greater detail with reference to the examples of the invention set forth below.

The test samples and physical properties of the following working examples and comparative examples were prepared and measured according to the following methods:

| | |
|---|---|
| Tensile strength | ASTM D-638 (using a 2 in/min. crosshead without extensometer) |
| Break Elongation | ASTM D-638 |
| Break @ Weldline | ASTM D-638 (measured on a dual gated T-bar) |
| Flexural Modulus | ASTM D-790 and D-618, Procedure A (0.5 in/min. crosshead speed and center section of a molded T-bar) |
| Flexural Strength | ASTM D-638, Procedure A (center section of a molded T-bar) |
| Notched Izod | ASTM D-256-87 |
| Unnotched Izod | ASTM D-4812 |
| Weldline Strength | ASTM D-638 (measured on a dual gated T-bar) |
| Retained Weldline Strength | Determined by dividing the weldline strength by the tensile strength) |
| Melt Flow Rate (MFR) | ASTM D-1238, condition L |

Example 1

A polyolefin composition of the present invention was produced by a general procedure comprising tumble blending:

(A) 77% of a graft copolymer of a propylene homopolymer (in spherical form, MFR of 9 g/10 min., porosity of 0.46 cc/g, $M_w/M_n$ of 4.1, 98.9% insoluble in xylene at room temperature) grafted with styrene/methyl methacrylate/acrylonitrile (S/MMA/AN), containing 48.7% graft polymerized monomer content, based on the total graft copolymer, (monomer ratio of 45/25/30 wt.% of S/E/AN), produced by the peroxide method set forth herein;

(B) 23% of a heterophasic olefin polymer material consisting essentially of (a) 35% of a propylene homopolymer having a MFR of 20 dg/min, (b) 7% of a semicrystalline, essentially linear propylene-ethylene copolymer fraction containing 63.4% ethylene, and (c) 58% of an amorphorous ethylene-propylene copolymer containing 22.5% ethylene; and a stabilizing package consisting of 0.1% Irganox 1010 tetrakis-[methylene(3, 5-di-tert-butyl-4-hydroxyhydrocinnamate)] methane stabilizer, 0.08% Sandostab PEP-Q composition, the main component of which is tetrakis(2,4-di-tert-butylphenyl)-4-4'-biphenylene diphosphonite, and 0.07% calcium stearate until a homogeneous mixture was obtained.

The mixture was extruded at 445° F. and 375 rpm at 35 lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 450° F. and mold temperature of 135° F.

The polyolefin composition of the present invention produced above had an effective composition of 37.5% of S/MMA/AN and 15% of rubber, based on the total composition.

The physical properties of the composition are set forth in Table 1.

Example 2

A polyolefin composition of the present invention was prepared according to the general procedure and ingredients of example 1, except that:

(A) 78% of the graft copolymer was used;

(B) 22% of a heterophasic olefin polymer material consisting essentially of (a) 33% of a random copolymer of propylene and ethylene containing 3.5% ethylene having a MFR of 10 g/10 min, (b) 7.4% of a semicrystalline, essentially linear propylene-ethylene copolymer fraction containing 73.4% ethylene, and (c) 59.6% of an amorphorous ethylene-propylene copolymer containing 22.5% ethylene was used.

The polyolefin composition produced above had an effective composition of 38% of S/MMA/AN and 15% of rubber, based on the total composition.

The physical properties of the composition are set forth in Table 1.

Example 3

A polyolefin composition of the present invention was prepared according to the general procedure and ingredients of Example 2, except that:

(B) 22% of a heterophasic olefin polymer material consisting essentially of (a) 30% of a random copolymer of propylene and ethylene containing 3.3% ethylene having a MFR of 20 g/10 min., (b) 7.7% of a semicrystalline, essentially linear propylene-ethylene copolymer fraction containing 71.6% ethylene, and (c)

62.3% of an amorphorous ethylene-propylene copolymer containing 22.5% ethylene was used.

The polyolefin composition of the present invention produced above had an effective composition of 38% of S/MMA/AN and 15% of rubber, based on the total composition.

The physical properties of the composition are set forth in Table 1.

Example 4

A polyolefin composition was prepared according to the general procedure and ingredients of example 1, except that:

(A) 77% of graft copolymer of a propylene homopolymer grafted with styrene/methyl methacrylate/acrylonitrile (S/MMA/AN), containing 54.5% graft polymerized monomer content, based on the total graft copolymer, (monomer ratio of 45/25/30 wt. % of S/MMA/AN), produced by the peroxide method set forth herein was used.

The polyolefin composition produced above had an effective composition of 42% of S/MMA/AN and 15% of rubber, based on the total composition.

The physical properties of the composition are set forth in Table 1.

Example 5

A polyolefin composition of the present invention was prepared according to the general procedure and ingredients of example 2, except that:

(A) 78% of graft copolymer of a propylene homopolymer grafted with styrene/methyl methacrylate/acrylonitrile (S/MMA/AN), containing 54.5% graft polymerized monomer content, based on the total graft copolymer, (monomer ratio of 45/25/30 wt. % of S/MMA/AN), produced by the peroxide method set forth herein was used.

The polyolefin composition produced above had an effective composition of 42% of S/E/AN and 15% of rubber, based on the total composition.

The physical properties of the composition are set forth in Table 1.

Example 6

A polyolefin composition of the present invention was prepared according to the general procedure and ingredients of example 3, except that:

(A) 78% of graft copolymer of a propylene homopolymer grafted with styrene/methyl methacrylate/acrylonitrile (S/MMA/AN), containing 54.5% graft polymerized monomer content, based on the total graft copolymer, (monomer ratio of 45/25/30 wt. % of S/MMA/AN), produced by the peroxide method set forth herein was used.

The polyolefin composition produced above had an effective composition of 42% of S/MMA/AN and 15% of rubber, based on the total composition.

The physical properties of the composition are set forth in Table 1.

Control 1

A comparative polyolefin composition was prepared according to the general procedure and ingredients of example 1, except that:

(A) 85% of a graft copolymer of a propylene homopolymer (spherical form, MFR of 9 g/10 min., porosity of 0.46 cc/g, $M_w/M_n$ of 4.1, 98.9% insoluble in xylene at room temperature) grafted with styrene/methyl methacrylate/acrylonitrile (S/MMA/AN), containing 41.2% graft polymerized monomer content, based on the total graft copolymer, (monomer ratio of 45/25/30 wt. % of S/MMA/AN), produced by the peroxide method set forth herein; and (B) 15% of Polysar 306P ethylene-propylene copolymer rubber containing 60% ethylene were used.

The polyolefin composition produced above had an effective composition of 35% of S/MMA/AN and 15% rubber, based on the total composition.

The physical properties of the composition are set forth in Table 1.

Control 2

A comparative composition was prepared according to the general procedure and ingredients of control 1, except that:

(A) 85% of a graft copolymer of a propylene homopolymer grafted with styrene/methyl methacrylate/acrylonitrile (S/MMA/AN), containing 48.7% graft polymerized monomer content, based on the total graft copolymer, (monomer ratio of 45/25/30 wt. % of S/MMA/AN), produced by the peroxide method set forth herein was used.

The polyolefin composition produced above had an effective composition of 41.4% of S/MMA/AN and 15% rubber, based on the total composition.

The physical properties of the composition are set forth in Table 1.

Control 3

A comparative polyolefin composition was prepared according to the general procedure and ingredients of control 1, except that (A) 64% of a graft copolymer of a propylene homopolymer grafted with styrene/methyl methacrylate/acrylonitrile (S/MMA/AN), containing 48.7% graft polymerized monomer content, based on the total graft copolymer, (monomer ratio of 45/25/30 wt. % of S/MMA/AN), produced by the peroxide method set forth herein; and (B) 36% of Hifax 7095 ethylene-propylene-butene terpolymer commercially available from HIMONT Italia S.r.l.

The polyolefin composition produced above had an effective composition of 31.2% of S/MMA/AN and 15% rubber, based on the total composition.

The physical properties of the composition are set forth in Table 1.

Control 4

A comparative polyolefin composition was prepared according to the general procedure and ingredients of control 3, except that:

(A) 76% of the graft copolymer of a propylene homopolymer grafted with styrene/methyl methacrylate/acrylonitrile (S/MMA/AN), containing 48.7% graft polymerized monomer content, based on the total graft copolymer, (monomer ratio of 45/25/30 wt. % of S/MMA/AN), produced by the peroxide method set forth herein; and (B) of 15% Polysar 306P ethylene-propylene copolymer rubber containing 60% ethylene and 9% Pro-fax 6523 propylene homopolymer, where the amount of the two modifers total 24%, were used.

Said polyolefin composition produced above had an effective composition of 37% of S/MMA/AN and 15% rubber, based on the total composition.

The physical properties of the composition are set forth in Table 1.

lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 450° F. and mold temperature of 135° F.

TABLE 1

| INGREDIENTS | C1 | C2 | C3 | C4 | E1 | E2 | E3 | E4 | E5 | E6 |
|---|---|---|---|---|---|---|---|---|---|---|
| PP-g-S/MMA/AN, % | 85 | 85 | 64 | 76 | 77 | 78 | 78 | 77 | 78 | 78 |
| Heterophasic Composition, % | — | — | — | — | 23 | 22 | 22 | 23 | 22 | 22 |
| Modifier, % | 15 | 15 | 36 | 24 | — | — | — | — | — | — |
| Eff. Comp., % | 35 | 41.4 | 31.2 | 37 | 37.5 | 38 | 38 | 42 | 42.5 | 42.5 |
| % Rubber | 15 | 15 | 15 | 15 | 15 | 15 | 15 | 15 | 15 | 15 |
| PROPERTIES | | | | | | | | | | |
| N. Izod (ft-lb/in) | 2.0 | 1.9 | 0.6 | 2.1 | 2.2 | 2.0 | 2.4 | 1.9 | 1.9 | 1.9 |
| Unnotched Izod (ft-lb/in) | 18 | 18 | — | 24 | 22 | 34 | 31 | 26 | 29 | 30 |
| Tensile Str., psi | 3816 | 3826 | 4171 | 3719 | 3928 | 3808 | 3732 | 3818 | 3710 | 3596 |
| Weldline Str., psi | 2661 | 2738 | 3746 | 2817 | 3586 | 3470 | 3358 | 3544 | 3377 | 3313 |
| Retained Str., % | 70 | 72 | 90 | 76 | 91 | 91 | 90 | 93 | 91 | 92 |
| Elongation | | | | | | | | | | |
| to break, % | 41 | 36 | 17 | 45 | 69 | 105 | 36 | 59 | 58 | 79 |
| to break @ W.L, % | 4 | 5 | 7 | 6 | 9 | 9 | 9 | 8 | 8 | 8 |
| Flex Modulus, kpsi | 255 | 254 | 296 | 252 | 231 | 224 | 210 | 226 | 223 | 210 |
| Flex Strength, psi | 6784 | 6632 | 7868 | 6654 | 6741 | 6635 | 6362 | 6671 | 6530 | 6241 |
| MFR, dg/min | 2.9 | 2.4 | 7.3 | 2.0 | 2.7 | 2.3 | 2.2 | 2.0 | 1.6 | 1.8 |

The polyolefin compositions of Examples 1–6 and the comparative compositions of Controls 1, 2 and 4 have similar stiffness and impact properties. However, it can be seen that compositions of the examples of the instant invention have much higher weldline strength and strength retention than the comparative compositions of Controls 1, 2 and 4. While it is noted that Control 3 has good weldline strength and retained strength, the impact properties are deficient.

Example 7

A polyolefin composition of the present invention was produced by a general procedure comprising tumble blending:

(A) 70% of a graft copolymer of a propylene homopolymer (in spherical form, MFR of 9 g/10 min., porosity of 0.46 cc/g, $M_w/M_n$ of 4.1, 98.9% insoluble in xylene at room temperature) grafted with styrene/acrylonitrile (S/AN), containing 48.7% graft polymerized monomer content, based on the total graft copolymer, (monomer ratio of 67/33 wt. % of S/AN), produced by the peroxide method set forth herein;

(B) 30% of a heterophasic olefin polymer material consisting essentially of (a) 50% of a random copolymer of propylene and ethylene containing 3.6% ethylene having a MFR of >200 g/10 min, (b) 5.5% of a semi-crystalline, essentially linear propylene-ethylene copolymer fraction containing 72.5% ethylene, and (c) 44.5% of an amorphorous ethylene-propylene copolymer containing 22.5% ethylene; and a stabilizing package of consisting of 0.1% Irganox 1010 tetrakis-[methylene(3,5-di-tert-butyl-4-hydroxyhydrocinnamate)] methane stabilizer, 0.08% Sandostab PEP-Q composition, the main component of which is tetrakis(2,4-di-tert-butyl-phenyl)-4-4'-biphenylene diphosphonite, and 0.07% calcium stearate until a homogeneous mixture was obtained.

The mixture was extruded at 445° F. and 375 rpm at 35

The polyolefin composition of the present invention produced above had an effective composition of 34.1% of S/AN and 15% rubber, based on the total composition.

The physical properties of the composition are set forth in Table 2.

Example 8

A polyolefin composition of the present invention was prepared according to the general procedure and ingredients of example 7, except that:

(A) 77% of graft copolymer of a propylene homopolymer grafted with styrene/acrylonitrile (S/AN), containing 45.1% graft polymerized monomer content, based on the total graft copolymer, (monomer ratio of 67/33 wt. % of S/AN), produced by the peroxide method set forth herein;

(B) 23% of a heterophasic olefin polymer material consisting essentially of (a) 35% of a propylene homopolymer having a MFR of 20 g/10 min, (b) 7% of a semi-crystalline, essentially linear propylene-ethylene copolymer fraction containing 63.4% ethylene, and (c) 58% of an amorphorous ethylene-propylene copolymer containing 22.5% ethylene; a stabilization package consisting of 0.2% Irganox B-225 2,2-Bis[[3-[3,5-bis(1,1-dimethylethyl)-4 -hydroxyphenyl]-1-oxopropoxy]methyl]-1,3-propanediyl-3,5-bis(1,1-dimethylethyl)-4-hydroxybenzene-propanoate stabilizer and Tris(2,4-di-tert-butylphenyl) phosphite stabilizer in a 50:50 blend and 0.1% calcium stearate; and a mold temperature of 160° F. were used.

The polyolefin composition of the present invention produced above had an effective composition of 34.7% of S/AN and 15% rubber, based on the total composition.

The physical properties of the composition are set forth in Table 2.

Example 9

A polyolefin composition of the present invention was prepared according to the general procedure and ingredients of example 7, except that:

(B) 23% of a heterophasic olefin polymer material consisting essentially of (a) 33% of a random copolymer of propylene and ethylene containing 3.5% ethylene and having a MFR of 10 g/10 min, (b) 7.4% of a semi-crystalline, essentially linear propylene-ethylene copolymer fraction containing 73.4% ethylene, and (c) 59.6% of an amorphorous ethylene-propylene copolymer containing 22.5% ethylene was used.

The polyolefin composition of the present invention produced above had an effective composition of 34.7% of S/AN 15% rubber, based on the total composition.

The physical properties of the composition are set forth in Table 2.

Control 5

A comparative polyolefin composition was prepared according to the general procedure and ingredients of example 7, except that:

(A) 83% of a graft copolymer of propylene homopolymer (in spherical form, MFR of 9 g/10 min., porosity of 0.46 cc/g, $M_w/M_n$ of 4.1, 98.9% insoluble in xylene at room temperature) grafted with styrene/acrylonitrile (S/AN), containing 41.1% graft polymerized monomer content, based on the total graft copolymer, (monomer ratio of 67/33 wt. % of S/AN), produced by the peroxide method set forth herein;

(B) 17% of Polysar 306P ethylene-propylene copolymer rubber containing 60% ethylene were used.

The polyolefin composition of the present invention produced above had an effective composition of 34.1% of S/AN and 17% rubber, based on the total composition.

The physical properties of the composition are set forth in Table 2.

Control 6

A comparative polyolefin composition was prepared according to the general procedure and ingredients of control 5, except that:

(A) 85% of the graft copolymer of propylene homopolymer grafted with styrene/acrylonitrile (S/AN), containing 41.1% graft polymerized monomer content, based on the total graft copolymer, (monomer ratio of 67/33 wt. % of S/AN), produced by the peroxide method set forth herein; and (B) 15% of Polysar 306P ethylene-propylene copolymer rubber containing 60% ethylene were used.

The polyolefin composition of the present invention produced above had an effective composition of 34.9% of S/AN and 15% rubber, based on the total composition.

The physical properties of the composition are set forth in Table 2.

Control 7

A comparative polyolefin composition was prepared according to the general procedure and ingredients of control 5, except that:

(A) 70% of a graft copolymer of a propylene homopolymer grafted with styrene/acrylonitrile (S/AN), containing 48.7% graft polymerized monomer content, based on the total graft copolymer, (monomer ratio of 67/33 wt. % of S/AN), produced by the peroxide method set forth herein; and (B) 30% of a heterophasic olefin polymer material consisting essentially of (a) 40% of a propylene homopolymer having a MFR of 90, (b) 10.2% of a semi-crystalline, essentially linear propylene-ethylene copolymer fraction containing 96.6% ethylene and 49.8% of an amorphous ethylene-propylene copolymer containing 42.5% ethylene were used.

The polyolefin composition of the present invention produced above had an effective composition of 34.1% of S/AN and 17% rubber, based on the total composition.

The physical properties of the composition are set forth in Table 2.

Control 8

A comparative polyolefin composition was prepared according to the general procedure and ingredients of control 5, except that:

(A) 85% of the graft copolymer of propylene homopolymer grafted with styrene/acrylonitrile (S/AN), containing 1.1% graft polymerized monomer content, based on the total graft copolymer, (monomer ratio of 67/33 wt. % of S/AN), produced by the peroxide method set forth herein;

(B) 15% of Polysar 306P ethylene-propylene copolymer rubber containing 60% ethylene; and a stabilization package consisting of 0.2% Irganox B-225 2,2-Bis[[3-[3,5-bis(1,1-dimethylethyl)-4-hydroxyphenyl]-1-oxopropoxy]methyl]-1,3-propanediyl-3,5 -bis(1,1-dimethylethyl)-4-hydroxybenzene-propanoate stabilizer and Tris(2,4-di-tert-butylphenyl) phosphite stabilizer in a 0:50 blend and 0.1% calcium stearate; and a mold temperature of 160° F. were used.

The polyolefin composition of the present invention produced above had an effective composition of 34.9% of S/AN and 15% rubber, based on the total composition.

The physical properties of the composition are set forth in Table 2.

TABLE 2

| INGREDIENTS | C5 | C6 | C7 | C8 | E7 | E8 | E9 |
| --- | --- | --- | --- | --- | --- | --- | --- |
| PP-g-S/AN, % | 83 | 85 | 70 | 85 | 70 | 77 | 77 |
| Heterophasic Composition, % | — | — | — | — | 30 | 23 | 23 |
| Modifier, % | 17 | 15 | 30 | 15 | — | — | — |
| Eff. S/AN Comp., % | 34.1 | 34.9 | 34.1 | 34.9 | 34.1 | 34.7 | 34.7 |
| % Rubber | 17 | 15 | 17 | 15 | 15 | 15 | 15 |
| PROPERTIES | | | | | | | |
| Notched Izod @ 23° C. | 2.7 | 2.2 | 1.5 | 2.5 | 2.0 | 2.1 | 2.5 |

TABLE 2-continued

| INGREDIENTS | C5 | C6 | C7 | C8 | E7 | E8 | E9 |
|---|---|---|---|---|---|---|---|
| (ft-lb/in) | | | | | | | |
| Unnotched Izod (ft-lb/in) | 24 | 23 | 21 | 26.0 | 31 | 32.1 | 30.0 |
| Tensile Str., psi | 3727 | 4124 | 3607 | 3946 | 3798 | 4053 | 3849 |
| Weldline Str., psi | 2785 | 3157 | 2983 | 3031 | 3318 | 3650 | 3447 |
| Retained Str., % | 75 | 77 | 83 | 77 | 87 | 90 | 90 |
| Elongation | | | | | | | |
| to break, % | 39 | 43 | 35 | 46 | 76 | 77 | 91 |
| to break @ W.L, % | 5 | 6 | 5 | 6 | 8 | 8 | 8 |
| Flex Modulus, kpsi | 244 | 262 | 250 | 254 | 212 | 230 | 214 |
| Flex Strength, psi | 6647 | 7225 | 6511 | 6859 | 6151 | 6927 | 6536 |
| MFR, dg/min | 1.6 | — | 1.9 | 5.7 | — | — | — |

It can be seen in Table 2 that Examples 7–9 of the present invention have higher weldline strength and retained strength than the compositions of Controls 5, 6 and 8. While it is noted that Control 7 has good weldline strength and retained strength, the impact properties are deficient.

Example 10

A polyolefin composition of the present invention was produced by a general procedure comprising tumble blending:

(A) 81% of a graft copolymer of a propylene homopolymer (in spherical form, MFR of 9.2 g/10 min., porosity of 0.61 cc/g, $M_w/M_n$ of 4.8, 97% insoluble in xylene at room temperature) grafted with styrene/acrylonitrile (S/AN), containing 45.9% graft polymerized monomer content, based on the total graft copolymer, (monomer ratio of 67/33 wt. % of S/AN), produced by the peroxide method set forth herein;

(B) 16% of a heterophasic olefin polymer material consisting essentially of (a) 35% of a propylene homopolymer having a MFR of 20 g/10 min, (b) 7% of a semi-crystalline, essentially linear propylene-ethylene copolymer fraction containing 63.4% ethylene, and (c) 58% of an amorphorous ethylene-propylene copolymer containing 22.5% ethylene;

(C) 3% of Pro-fax 6523 propylene homopolymer commercially available from HIMONT U.S.A. and HIMONT Italia, S.r.l.; and a stabilizing package consisting of 0.1% Irganox 1010 tetrakis-[methylene(3,5-di-tert-butyl-4-hydroxyhydrocinnamate)] methane stabilizer, 0.08% Sandostab PEP-Q composition, the main component of which is tetrakis(2,4-di-tert-butyl-phenyl)-4-4'-biphenylene diphosphonite, and 0.07% calcium stearate until a homogeneous mixture was obtained.

The mixture was extruded at 445° F. and 375 rpm at 35 lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 450° F. and mold temperature of 135° F.

The polyolefin composition of the present invention produced above had an effective composition of 37.2 of S/AN and 10% rubber, based on the total composition.

The physical properties of the composition are set forth in Table 3.

Example 11

A polyolefin composition of the present invention was prepared according to the general procedure and ingredients of example 10, except that:

(A) 85% of the graft copolymer of a propylene homopolymer grafted with styrene/acrylonitrile (S/AN), containing 45.9% graft polymerized monomer content, based on the total graft copolymer, (monomer ratio of 67/33 wt. % of S/AN), produced by the peroxide method set forth herein;

(B) 8% of the heterophasic olefin polymer material; and (C) 7% of the propylene homopolymer were used.

The polyolefin composition produced above had an effected composition of 39.0% of S/AN and 15% rubber, based on the total composition.

The physical properties of the composition are set forth in Table 3.

Example 12

A polyolefin composition of the present invention was prepared according to the general procedure and ingredients of example 10, except that:

(A) 64.4% of a graft copolymer of a propylene homopolymer (in pellet form, MFR of 9 g/10 min., porosity of 0.46 cc/g, $M_w/M_n$ of 4.1, 98.9% insoluble in xylene at room temperature) grafted with styrene/methyl methacrylate/acrylonitrile (S/MMA/AN), containing 54.5% graft polymerized monomer content, based on the total graft copolymer, (monomer ratio of 45/25/30 wt. % of S/MMA/AN), produced by the peroxide method set forth herein;

(B) 22.8% of the heterophasic polyolefin composition;

(C) 12.8% of the Pro-fax 6523 propylene homopolymer; and a stabilizing package consisting of 0.2% Irganox B-225 2,2-Bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and Tris(2,4-di-tert-butylphenyl) phosphite stabilizer in a 50:50 blend and 0.1% calcium stearate; and a mold temperature of 160° F. were used.

The polyolefin composition of the present invention produced above had an effective composition of 35.1% of S/MMA/AN and 15% rubber, based on the total composition.

The physical properties of the composition are set forth in Table 3.

Control 9

A comparative polyolefin composition was prepared according to the general procedure and ingredients of example 10, except that:

(A) 95% of the graft copolymer of a propylene homopolymer (in spherical form, MFR of 9.2 g/10 min., porosity of 0.61 cc/g, $M_w/M_n$ of 4.8, 97% insoluble in xylene at room temperature) grafted with styrene/acrylonitrile (S/AN), containing 41.2% graft polymerized monomer content, based on the total graft copolymer, (monomer ratio of 67/33 wt. % of S/AN), produced by the peroxide method set forth herein; and (B) 5% of Polysar 306P ethylene-propylene copolymer rubber containing 60% ethylene were used.

The polyolefin composition of the present invention produced above had an effective composition of 39.1% of S/AN and 15% rubber, based on the total composition.

The physical properties of the composition are set forth in Table 3.

Control 10

A comparative polyolefin composition was prepared according to the general procedure and ingredients of control 9, except that:

(A) 90% of the graft copolymer of a propylene homopolymer grafted with styrene/acrylonitrile (S/AN), containing 41.2% graft polymerized monomer content, based on the total graft copolymer, (monomer ratio of 67/33 wt. % of S/AN), produced by the peroxide method set forth herein; and (B) 10% of Polysar 306P ethylene-propylene copolymer rubber containing 60% ethylene were used.

The polyolefin composition of the present invention produced above had an effective composition of 37.1% of S/AN and 15% rubber, based on the total composition.

The physical properties of the composition are set forth in Table 3.

Example 13

A polyolefin composition of the present invention was produced by a general procedure comprising tumble blending:

(A) 61.6% of a graft copolymer of a propylene homopolymer (in spherical form, MFR of 9 g/10 min., porosity of 0.46 cc/g, $M_w/M_n$ of 4.1, 98.9% insoluble in xylene at room temperature) grafted with styrene/maleic anhydride (S/MA), containing 45.9% graft polymerized monomer content, based on the total graft copolymer, (monomer ratio of 61.4/38.6 wt. % of S/MA), produced by the peroxide method set forth herein;

(B) 23.1% of a heterophasic olefin polymer material consisting essentially of (a) 33% of a random copolymer of propylene and ethylene containing 3.5% ethylene, (b) 7.4% of a semi-crystalline, essentially linear propylene-ethylene copolymer fraction containing 73.4% ethylene, and (c) 59.6% of an amorphorous ethylene-propylene copolymer containing 22.5% ethylene;

(C) 15.3% of Pro-fax 6801 propylene homopolymer; and a stabilizing package consisting of 0.1% Irganox 1010 tetrakis-[methylene(3,5-di-tert-butyl-4-hydroxyhydrocinnamate)] methane stabilizer, 0.08% Sandostab PEP-Q composition, the main component of which is tetrakis(2,4-di-tert-butyl-phenyl)-4-4'-biphenylene diphosphonite, and 0.07% calcium stearate until a homogeneous mixture was obtained.

The mixture was extruded at 482° F. and 375 rpm at 35 lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 490° F. and mold temperature of 150° F.

The polyolefin composition of the present invention produced above had an effective composition of 28.3% of S/MA and 15% rubber, based on the total composition.

The physical properties of the composition are set forth in Table 4.

TABLE 3

| INGREDIENTS | C9 | C10 | C1* | E10 | E11 | E12 |
|---|---|---|---|---|---|---|
| PP-g-S/AN, % | 95 | 90 | — | 81 | 85 | — |
| PP-g-S/MMA/AN, % | — | — | 85 | — | — | 64.4 |
| Heterophasic Composition, % | — | — | — | 16 | 8 | 22.8 |
| Modifier, % | 5 | 10 | 15 | — | — | — |
| Polypropylene, % | — | — | — | 3 | 7 | 12.8 |
| Eff. Comp., % | 39.1 | 37.1 | 35 | 37.1 | 39 | 35.1 |
| % Rubber | 5 | 10 | 15 | 10 | 5 | 15 |
| PROPERTIES | | | | | | |
| Notched Izod @ 23° C. (ft-lb/in) | 1.35 | 1.76 | 2.0 | 1.90 | 1.15 | 1.99 |
| Unnotched Izod (ft-lb/in) | 24.9 | 32.0 | 18 | 34.3 | 23.5 | 29.9 |
| Tensile Str., psi | 4939 | 4274 | 3816 | 4498 | 5057 | 3871 |
| Weldline Str., psi | 4527 | 3263 | 2661 | 4215 | 4929 | 3489 |
| Retained Str., % | 92 | 76 | 70 | 93.7 | 97.5 | 90 |
| Elongation | | | | | | |
| to break, % | 46 | 79 | 41 | 61 | 36 | 82 |
| to break @ W.L, % | 7 | 5.3 | 4 | 9.2 | 8.7 | 9 |
| Flex Modulus, kpsi | 310 | 272 | 255 | 256 | 300 | 223 |
| Flex Strength, psi | 8595 | 7415 | 6784 | 7686 | 8796 | 6789 |

*C1 is Control 1 described in Table 1

It can be seen in Table 3 that Examples 10–12 of the present invention have higher weldline strength and retained strength than the compositions of Controls 9 and 10.

Example 14

A polyolefin composition of the present invention was prepared according to the general procedure and ingredients of example 13, except that:

(A) 61.6% of a graft copolymer of propylene homopolymer grafted with styrene/maleic anhydride/alpha-methylstyrene (S/MA/alpha-MS), containing 45.9% graft polymerized monomer content, based on the total graft copolymer, (monomer ratio of 19.4/36.6/44 wt. % of S/MA/alpha-MS), produced by the peroxide method set forth herein was used.

The polyolefin composition of the present invention produced above had an effective composition of 28.3% of S/MA/alpha-MS and 15% rubber, based on the total composition.

mer grafted with styrene/maleic anhydride/alpha-methylstyrene (S/MA/alpha-MS), containing 33.3% graft polymerized monomer content, based on the total graft copolymer, (monomer ratio of 19.4/36.6/44 wt. % of S/MA/alpha-MS), produced by the peroxide method set forth herein; and (B) 15% of Polysar 306P ethylene-propylene copolymer rubber containing 60% ethylene were used.

The polyolefin composition of the present invention produced above had an effective composition of 28.3% of S/MA/alpha-MS and 15% rubber, based on the total composition.

The physical properties of the composition are set forth in Table 4.

TABLE 4

| INGREDIENTS | E13 | C11 | E14 | C12 |
| --- | --- | --- | --- | --- |
| PP-g-S/MA, % | 61.6 | 85 | — | — |
| PP-g-S/MA/alpha methylstyrene, % | — | — | 61.6 | 85 |
| Heterophasic Composition, % | 23.1 | — | 23.1 | — |
| Modifier, % | — | 15 | — | 15 |
| Polypropylene, % | 15.3 | — | 15.3 | — |
| Eff. Comp., % | 28.3 | 28.3 | 28.3 | 28.3 |
| % Rubber | 15 | 15 | 15 | 15 |
| PROPERTIES | | | | |
| Notched Izod @ 23° (ft-lb/in) | 1.40 | 1.76 | 2.38 | 1.79 |
| Unnotched Izod (ft-lb/in) | 14.7 | 14.9 | 33.4 | 24.0 |
| Tensile Str., psi | 3643 | 3997 | 3886 | 3959 |
| Weldline Str., psi | 3472 | 3431 | 3752 | 2950 |
| Retained Str., % | 95 | 86 | 97 | 75 |
| Elongation | | | | |
| to break, % | 99.5 | 48.4 | 315.9 | 79.9 |
| to break @ W.L, % | 13.2 | 7.7 | 15.9 | 5.8 |
| Flex Modulus, kspi | 196.3 | 238.3 | 201.3 | 238.3 |
| Flex Strength, psi | 5933 | 6892 | 6185 | 6736 |

The physical properties of the composition are set forth in Table 4.

Control 11

A comparative polyolefin composition was prepared according to the general procedure ingredients of example 13, except that:

(A) 85% of the graft copolymer of a propylene homopolymer grafted with styrene/maleic anhydride (S/MA), containing 33.3% graft polymerized monomer content, based on the total graft copolymer, (monomer ratio of 61.4/38.6 wt. % of S/MA), produced by the peroxide method set forth herein; and (B) 15% of Polysar 306P ethylene-propylene copolymer rubber containing 60% ethylene were used.

The polyolefin composition of the present invention produced above had an effective composition of 28.3% of S/MA and 15% rubber, based on the total composition.

The physical properties of the composition are set forth in Table 4.

Control 12

A comparative polyolefin composition was prepared according to the general procedure and ingredients of example 14, except that:

(A) 85% of the graft copolymer of propylene homopoly-

It can be seen in Table 4 that Examples 13 and 14 of the present invention have higher weldline strength and retained strength than the compositions of Controls 11 and 12.

Example 15

A polyolefin composition of the present invention was produced by a general procedure comprising tumble blending:

(A) 64.1% of a graft copolymer of a propylene homopolymer (in spherical form, MFR of 9.2 g/10 min., porosity of 0.61 cc/g, $M_w/M_n$ of 4.8, 97% insoluble in xylene at room temperature) grafted with methyl methacrylate/methyl acrylate (MMA/MeAc), containing 54.5% graft polymerized monomer content, based on the total graft copolymer, (monomer ratio of 95/5 wt. % of MMA/MeAc) produced by the peroxide method set forth herein;

(B) 23.1% of a heterophasic olefin polymer material consisting essentially of (a) 33% of a propylene homopolymer having a MFR of 10 g/10 min, (b) 7.4% of a semi-crystalline, essentially linear propylene-ethylene copolymer fraction containing 73.4% ethylene, and (c) 59.6% of an amorphorous ethylene-propylene copolymer containing 22.5% ethylene;

(C) 12.8% of Pro-fax 6801 propylene homopolymer commercially available from HIMONT U.S.A. and HIMONT Italia, S.r.l.; and a stabilizing package consisting of 0.2% Irganox B-225 2,2-Bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and Tris(2,4-di-tert-butylphenyl) phosphite stabilizer in a 50:50 blend and 0.1% calcium stearate until a homogeneous mixture was obtained.

The mixture was extruded at 445° F. and 375 rpm at 35 lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 450° F. and mold temperature of 160° F.

The polyolefin composition of the present invention produced above had an effective composition of 35% MMA/MeAc and 15% rubber, based on the total composition.

The physical properties of the composition are set forth in Table 5.

Example 16

A polyolefin composition of the present invention was prepared according to the general procedure and ingredients of example 15, except that:

(A) 70% of a graft copolymer of propylene homopolymer grafted with methyl methacrylate/methylacrylate (MMA/MeAc), containing 50.0% graft polymerized monomer content, based on the total graft copolymer, (monomer ratio of 95/5 wt % of MMA/MeAc), produced by the peroxide method set forth herein; and (C) 6.9% of the propylene homopolymer were used.

The polyolefin composition of the present invention produced above had an effective composition of 35% of MMA/MeAc and 15% rubber, based on the total composition.

The physical properties of the composition are set forth in Table 5.

Example 17

A polyolefin composition of the present invention was prepared according to the general procedure and ingredients of example 16, except that:

(B) 23.1% of a heterophasic olefin polymer material consisting essentially of (a) 35% of a propylene homopolymer, (b) 7% of a semi-crystalline, essentially linear propylene-ethylene copolymer fraction containing 63.4% ethylene, and (c) 58% of an amorphorous ethylene-propylene copolymer containing 22.5% ethylene was used.

The polyolefin composition of the present invention produced above had an effective composition of 35% of MMA/MeAc and 15% rubber, based on the total composition.

The physical properties of the composition are set forth in Table 5.

Control 13

A comparative polyolefin composition was prepared according to the general procedure and ingredients of example 15, except that:

(A) 85% of the graft copolymer of a propylene homopolymer (in spherical form, MFR of 9.2 g/10 min., porosity of 0.61 cc/g, $M_w/M_n$ of 4.8, 97% insoluble in xylene at room temperature) grafted with methyl methacrylate/methyl acrylate (MMA/MeAc), containing 41.2% graft polymerized monomer content, based on the total graft copolymer, (monomer ratio of 95/5 wt. % of MMA/MeAc), produced by the peroxide method set forth herein; and (B) 15% of Polysar 306P ethylene-propylene copolymer rubber containing 60% ethylene were used.

The polyolefin composition of the present invention produced above had an effective composition of 35% of S/AN and 15% rubber, based on the total composition.

The physical properties of the composition are set forth in Table 5.

Control 14

A comparative polyolefin composition was prepared according to the general procedure and ingredients of control 13, except that:

(A) 70% of the graft copolymer of a propylene homopolymer grafted with methyl methacrylate, containing 50% graft polymerized monomer content, based on the total graft copolymer, (monomer ratio of 95/5 wt. % of MMA/MeAc), produced by the peroxide method set forth herein; and (B) 23.1% of a heterophasic olefin polymer material consisting essentially of (a) 37% of a propylene homopolymer having a MFR of 10 g/10 min, (b) 15.7% of a semi-crystalline, essentially linear propylene-ethylene copolymer fraction containing 92.3% ethylene, and (c) 47.3% of an amorphous ethylene-propylene copolymer containing 47.5% ethylene; and (C) 6.9% of Pro-fax 6801 propylene homopolymer were used.

The polyolefin composition of the present invention produced above had an effective composition of 35% of MMA/MeAc and 15% rubber, based on the total composition.

The physical properties of the composition are set forth in Table 5.

TABLE 5

| INGREDIENTS | C13 | C14 | E15 | E16 | E17 |
|---|---|---|---|---|---|
| PP-g-MMA/MeAc, % | 85 | 70 | 64.1 | 70 | 70 |
| Heterophasic Composition, % | — | — | 23.1 | 23.1 | 23.1 |
| Modifier, % | 15 | 23.1 | — | — | — |
| Polypropylene, % | — | 6.9 | 12.8 | 6.9 | 6.9 |
| Eff. Comp., % | 35 | 35 | 35 | 35 | 35 |
| % Rubber | 15 | 15 | 15 | 15 | 15 |
| PROPERTIES | | | | | |
| Notched Izod @ 23° C. (ft-lb/in) | 1.41 | 1.20 | 3.41 | 1.74 | 1.5 |
| Unnotched Izod (ft-lb/in) | 28.2 | 14.1 | 28.8 | 29.6 | 23.4 |
| Tensile Str., psi | 3684 | 3727 | 3589 | 3484 | 3662 |

TABLE 5-continued

| INGREDIENTS | C13 | C14 | E15 | E16 | E17 |
|---|---|---|---|---|---|
| Weldline Str., psi | 2892 | 3117 | 3138 | 3116 | 3277 |
| Retained Str., % | 79 | 84 | 89 | 89 | 89 |
| Elongation | | | | | |
| to break, % | 44 | 21 | 249 | 104 | 79 |
| to break @ W.L, % | 5.8 | 5.9 | 12.6 | 9.9 | 9.6 |
| Flex Modulus, kpsi | 224 | 239 | 175 | 181 | 193 |
| Flex Strength, psi | 6409 | 6625 | 5495 | 5757 | 6176 |

It can be seen in Table 5 that Examples 15 to 17 of the present invention have higher weldline strength and retained strength than the compositions of Controls 13 and 14.

Examples 18

A polyolefin composition of the present invention was produced by a general procedure comprising tumble blending:

(A) 54% of a graft copolymer of propylene homopolymer (in spherical form, MFR of 9 g/10 min., 0.333 g/cc bulk density (poured), $M_w/M_n$ of 4.95, 96.4% insoluble in xylene at room temperature) grafted with styrene (PS), containing 45.9% graft polymerized monomer content, based on the total graft copolymer, produced by the peroxide method set forth herein;

(B) 30.8% of a heterophasic olefin polymer material consisting essentially of (a) 35% of a propylene homopolymer having a MFR of 20 g/10 min, (b) 7% of a semi-crystalline, essentially linear propylene-ethylene copolymer fraction containing 63.4% ethylene, and (c) 58% of an amorphorous ethylene-propylene copolymer containing 22.5% ethylene;

(C) 15.2% of Pro-fax 6801 propylene homopolymer commercially available from HIMONT U.S.A. and HIMONT Italia, S.r.l.; and a stabilizing package consisting of 0.2% Irganox B-225 2,2-Bis[[3-[3,5-bis(1,1-dimethylethyl)-4-hydroxyphenyl]-1-oxopropoxy]methyl]-1,3-propanediyl-3,5-bis(1,1-dimethylethyl)-4-hydroxybenzene-propanoate stabilizer and Tris(2,4-di-tert-butylphenyl) phosphite stabilizer in a 50:50 blend and 0.1% calcium stearate until a homogeneous mixture was obtained.

The mixture was extruded at 445° F. and 375 rpm at 35 lb/hr in a vacuum vented, tapered, counter-rotating, intermeshing 34 mm twin screw extruder manufactured by Leistritz. The extruded mixture was injection molded in a 5 ounce, 25 ton Battenfeld injection molding machine with a barrel temperature of 450° F. and mold temperature of 160° F.

The polyolefin composition of the present invention produced above had an effective composition of 24.8% of PS and 20% rubber, based on the total composition.

The physical properties of the composition are set forth in Table 6.

Example 19

A polyolefin composition of the present invention was prepared according to the general procedure and ingredients of example 18, except that:

(B) 30.8% of a heterophasic olefin polymer material consisting essentially of (a) 33% of a random copolymer of propylene and ethylene containing 3.5% ethylene and having a MFR of 10 g/10 min., (b) 7.4% of a semi-crystalline, essentially linear propylene-ethylene copolymer fraction containing 73.4% ethylene, and (c) 59.6% of an amorphorous ethylene-propylene copolymer containing 22.5% ethylene was used.

The polyolefin composition of the present invention produced above had an effective composition of 24.8 wt. % of PS and 20% rubber, based on the total composition.

The physical properties of the composition are set forth in Table 6.

Example 20

A polyolefin composition of the present invention was prepared according to the general procedure and ingredients of example 18, except that:

(B) 40% of a heterophasic olefin polymer material consisting essentially of (a) 50% of a random copolymer of propylene and ethylene containing 3.6% ethylene, (b) 5.5% of a semi-crystalline, essentially linear propylene-ethylene copolymer fraction containing 72.5% ethylene, and (c) 44.5% of an amorphorous ethylene-propylene copolymer containing 22.5% ethylene; and (C) 6% of Pro-fax 6801 propylene homopolymer were used.

The polyolefin composition of the present invention produced above had an effective composition of 24.8% of PS and 20% rubber, based on the total composition.

The physical properties of the composition are set forth in Table 6.

Control 15

A comparative polyolefin composition was prepared according to the general procedure and ingredients of example 18, except that:

(A) 80% of the graft copolymer of a propylene homopolymer (in spherical form, MFR of 9.2 g/10 min., 0.333 g/cc bulk density (poured), $M_w/M_n$ of 4.95, 96.4% insoluble in xylene at room temperature) grafted with styrene (PS), containing 31% graft polymerized monomer content, based on the total graft copolymer, produced by the peroxide method set forth herein; and (B) 20% of Polysar 306P ethylene-propylene copolymer rubber containing 60% ethylene were used.

The polyolefin composition of the present invention produced above had an effective composition of 24.8% of PS and 20% rubber, based on the total composition.

The physical properties of the composition are set forth in Table 6.

Control 16

A comparative polyolefin composition was prepared according to the general procedure and ingredients of example 18, except that:

(B) 30.8% of a heterophasic olefin polymer material consisting essentially of (a) 37% of a propylene homopolymer, (b) 15.7% of a semi-crystalline, essentially linear propylene-ethylene copolymer fraction containing 92.3% ethylene, and (c) 47.3% of an amorphous ethylene-propylene copolymer containing 47.5% ethylene was used.

The polyolefin composition of the present invention produced above had an effective composition of 24.8% of PS and 20% rubber, based on the total composition.

The physical properties of the composition are set forth in Table 6.

TABLE 6

| INGREDIENTS | C15 | C16 | E18 | E19 | E20 |
|---|---|---|---|---|---|
| PP-g-PS, % | 80 | 54 | 54 | 54 | 54 |
| Heterophasic Composition, % | — | — | 30.8 | 30.8 | 40 |
| Modifier, % | 20 | 30.8 | — | — | — |
| Polypropylene, % | — | 15.2 | 15.2 | 15.2 | 6.0 |
| Eff. PS Comp., % | 24.8 | 24.8 | 24.8 | 24.8 | 24.8 |
| % Rubber | 20 | 20 | 20 | 20 | 20 |
| PROPERTIES | | | | | |
| Notched Izod @ 23° C. (ft-lb/in) | 2.81 | 2.39 | 4.34 | 5.64 | 2.99 |
| Unnotched Izod (ft-lb/in) | 24.1 | 29.0 | 32.5 | 27.2 | 23.9 |
| Tensile Str., psi | 3633 | 3883 | 3593 | 3359 | 3092 |
| Weldline Str., psi | 1879 | 2672 | 2967 | 2757 | 2670 |
| Retained Str., % | 52 | 69 | 83 | 82 | 86 |
| Elongation | | | | | |
| to break, % | 60 | 69 | 390 | 523 | 462 |
| to break @ W.L, % | 3.1 | 5.3 | 8.1 | 8.3 | 9.1 |
| Flex Modulus, kpsi | 217 | 211 | 177 | 164 | 142 |
| Flex Strength, psi | 6158 | 6420 | 5773 | 5375 | 4779 |

It can be seen in Table 6 that Examples 18 to 20 of the present invention have higher weldline strength and retained strength than the compositions of Controls 15 and 16.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A polyolefin composition comprising, by weight, (A) 35 to 95% of a graft copolymer of a propylene polymer material, wherein the grafting monomer(s) are selected from the group consisting of (i) an aromatic vinyl compound, (ii) an acrylic compound, (iii) mixtures of (i) and (ii), and (iv) other copolymerizable monomers selected from the group consisting of $C_{1-10}$ linear or branched alkyl acrylates, acrylic acid, methacrylic acid, glycidyl methacrylate, glycidyl acrylate, maleic anhydride, acrylonitrile and methacrylonitrile with at least one (i) or at least one (ii) or mixtures of at least one (i) and at least one (ii) wherein said other copolymerizable monomer being present in an amount of up to 50%;

(B) 5 to 65% of a heterophasic olefin polymer material consisting essentially of:

(a) from about 10 to 50% of a propylene homopolymer having an isotactic index greater than 80, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin as defined in (a) (ii), said copolymer containing over 80% propylene and having an isotactic index greater than 80;

(b) from about 5 to 20% of a semi-crystalline, essentially linear copolymer fraction having a crystallinity of about 20 to 60% wherein the copolymer is selected from the group consisting of (i) ethylene and propylene containing over 55% ethylene,
(ii) ethylene, propylene, and an alpha-olefin as defined in (a) (ii) containing from 1 to 10% of the alpha-olefin and over 55% of both ethylene and alpha-olefin, and
(iii) ethylene and an alpha-olefin as defined in (a) (ii) containing over 55% of said alpha-olefin, which copolymer is insoluble in xylene at room or ambient temperature; and (c) from about 40 to 80% of a copolymer fraction is selected from the group consisting of a copolymer of (i) ethylene and propylene wherein the copolymer contains from 20% to less than 40% ethylene and, (ii) ethylene, propylene, and an alpha-olefin as defined in (a) (ii) wherein the alpha-olefin is present in an amount of 1 to 10% and the amount of ethylene and alpha-olefin present is from 20% to less than 40%, and (iii) ethylene and an alpha-olefin as defined in (a) (ii) containing from 20% to less than 40% of the alpha-olefin, and optionally with 0.5 to 10% of a diene, said copolymer fraction being soluble in xylene at ambient temperature, and having an intrinsic viscosity of from 1.5 to 4.0 dl/g; with the total of the (b) and (c) fractions, based on the total olefin polymer composition, being from about 50% to 90%, and the weight ratio of (b)/(c) being less than 0.4; and (C) from 0 to 55% of an ungrafted propylene polymer material selected from the group consisting of a homopolymer of propylene, a random copolymer of propylene and an alpha-olefin selected from ethylene and $C_4$–$C_{10}$ alpha-olefins.

2. The composition of claim 1, wherein said propylene polymer material of the graft copolymer of component (A)

is selected from the group consisting of a homopolymer of propylene, a random copolymer of propylene and an alpha-olefin selected from ethylene and $C_4$–$C_{10}$ alpha-olefins, and a random terpolymer of propylene with two alpha-olefins selected from ethylene and $C_4$–$C_8$ alpha-olefins.

3. The composition of claim 2, wherein the grafting monomer(s) of the graft copolymer of component (A) is selected from the group consisting of styrene, methyl methacrylate, styrene/acrylonitrile, styrene/methyl methacrylate, styrene/maleic anhydride, styrene/alpha-methyl styrene/maleic anhydride, methyl methacrylate/maleic anhydride, methyl methacrylate/methylacrylate, methyl methacrylate/acrylonitrile, methyl methacrylate/methacrylonitrile, styrene/methyl methacrylate/methacrylonitrile and styrene/methyl methacrylate/acrylonitrile.

4. The composition of claim 1, wherein (A) is a graft copolymer of styrene on a propylene polymer material backbone.

5. The composition of claim 4, wherein (A) is a graft copolymer of styrene on a polypropylene backbone or an ethylene/propylene random copolymer backbone.

6. The composition of claim 1, wherein (A) is a graft copolymer of methyl methacrylate/methylacrylate on a propylene polymer material backbone.

7. The composition of claim 6, wherein (A) is a graft copolymer of methyl methacrylate/methylacrylate on a polypropylene or an ethylene/propylene random copolymer backbone.

8. The composition of claim 1, wherein (A) is a graft copolymer of styrene/maleic anhydride on a propylene polymer material backbone.

9. The composition of claim 8, wherein (A) is a graft copolymer of styrene/maleic anhydride on a polypropylene backbone or an ethylene/propylene random copolymer backbone.

10. The composition of claim 1, wherein (A) is a graft copolymer of styrene/acrylonitrile on a propylene polymer material backbone.

11. The composition of claim 10, wherein (A) is a graft copolymer of styrene/acrylonitrile on a polypropylene or ethylene/propylene random copolymer backbone.

12. The composition of claim 11, wherein (A) is a graft copolymer of styrene/maleic anhydride/alpha-methylstyrene propylene polymer backbone.

13. The composition of claim 12, wherein (A) is a graft copolymer of styrene/maleic anhydride/alpha-methylstyrene on a polypropylene or ethylene/propylene backbone.

14. The composition of claim 1 comprising (A) 55 to 85% of a graft copolymer of styrene on a polypropylene backbone, (B) 45 to 15% of the heterophasic olefin polymer material and (C) 0 to 20% of polypropylene.

15. The composition of claim 1 comprising (A) 55 to 85% a graft copolymer of styrene/acrylonitrile on a polypropylene backbone, (B) 45 to 15% of the heterophasic olefin polymer material and (C) 0 to 20% of polypropylene.

16. The composition of claim 1 comprising (A) 55 to 85% of a graft copolymer of styrene/maleic anhydride a polypropylene backbone, (B) 45 to 15% of the heterophasic olefin polymer material and (C) 0 to 20% of polypropylene.

17. The composition of claim 1 comprising (A) 55 to 85% of a graft copolymer of styrene/maleic anhydride/alphamethylstyrene on a polypropylene backbone, (B) 45 to 15% of the heterophasic olefin polymer material and (C) 0 to 20% of polypropylene.

18. The composition of claim 1 comprising (A) 55 to 85% of a graft copolymer of methyl methacrylate/methyl acrylate on a polypropylene backbone, (B) 45 to 15% of the heterophasic olefin polymer material and (C) 0 to 20% of polypropylene.

19. The composition of claim 1, comprising (A) 55 to 85% of a graft copolymer of styrene/methyl methacrylate/acrylonitrile on a polypropylene backbone, (B) 45 to 15% of the heterophasic olefin polymer material and (C) 0 to 20% of polypropylene.

* * * * *

UNITED STATES PATENT AND TRADEMARK OFFICE
CERTIFICATE OF CORRECTION

PATENT NO.    : 5,455,300
DATED         : October 3, 1995
INVENTOR(S)   : Jeanine A. Smith It is certified that error appears in the above-indentified patent and that said Letters Patent is hereby corrected as shown below:

At col. 8, line 41, change " 2θ " to --2$\vartheta$--.

At col. 8, line 41, change "+0" to --,--.

At col. 8, line 42, change " 2θ " to --2$\vartheta$--.

At col. 8, line 53, change "$C_{6-8}$" to --$C_{6-18}$--.

At col. 10, line 7, change "S/E/AN" to --S/MMA/AN--.

At col. 11, line 39, change "S/E/AN" to --S/MMA/AN--.

At col. 16, line 37, change "1.1%" to --41.1%--.

At col. 16, line 49, change "0:50" to --50:50--.

Signed and Sealed this

Eleventh Day of June, 1996

Attest:

BRUCE LEHMAN

Attesting Officer

Commissioner of Patents and Trademarks